United States Patent
Pearson et al.

(10) Patent No.: US 9,869,185 B2
(45) Date of Patent: Jan. 16, 2018

(54) ROTATING TURBINE COMPONENT WITH PREFERENTIAL HOLE ALIGNMENT

(71) Applicant: General Electric Company, Schenectady, NY (US)

(72) Inventors: Shawn Michael Pearson, West Chester, OH (US); Steven Robert Brassfield, Cincinnati, OH (US); Stephen Mark Molter, Cincinnati, OH (US); Mark Edward Stegemiller, Franklin, OH (US); Nicholas Ertel, Cincinnati, OH (US); Vanessa Camarillo, West Chester, OH (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 14/418,626

(22) PCT Filed: Jul. 30, 2013

(86) PCT No.: PCT/US2013/052667
§ 371 (c)(1),
(2) Date: Jan. 30, 2015

(87) PCT Pub. No.: WO2014/025571
PCT Pub. Date: Feb. 13, 2014

(65) Prior Publication Data
US 2015/0226069 A1    Aug. 13, 2015

Related U.S. Application Data

(60) Provisional application No. 61/680,018, filed on Aug. 6, 2012.

(51) Int. Cl.
*F01D 5/14* (2006.01)
*F01D 5/18* (2006.01)
*B23P 15/04* (2006.01)

(52) U.S. Cl.
CPC .............. *F01D 5/185* (2013.01); *B23P 15/04* (2013.01); *F01D 5/147* (2013.01); *F01D 5/187* (2013.01);
(Continued)

(58) Field of Classification Search
CPC .......... F01D 5/147; F01D 5/187; F01D 5/185; F01D 2250/14; B23P 15/04
See application file for complete search history.

(56) References Cited

U.S. PATENT DOCUMENTS 5,342,172 A * 8/1994 Coudray ................. F01D 5/186
416/95
5,674,050 A   10/1997 Hall
(Continued)

FOREIGN PATENT DOCUMENTS

| CN | 1776199 A | 5/2006 |
|---|---|---|
| EP | 1022434 A1 | 10/1989 |
| EP | 0335481 A1 | 10/1997 |

OTHER PUBLICATIONS

Unofficial English Translation of Chinese Office Action issued in connection with corresponding CN Application No. 20138004208911.1 dated Jul. 17, 2015.
(Continued)

*Primary Examiner* — Matthew W Jellett
(74) *Attorney, Agent, or Firm* — General Electric Company; William Scott Andes

(57) ABSTRACT

A turbine airfoil includes: a concave pressure sidewall and a convex suction sidewall joined together at a leading edge and a trailing edge, and extending between a root and a tip; an internal rib extending between the pressure sidewall and the suction sidewall; and a crossover hole formed in the rib, the crossover hole having a noncircular cross-sectional shape with a major axis defining a maximum dimension of the cross-sectional shape; wherein the major axis of the crossover hole lies in plane with the rib and is non-parallel
(Continued)

to an imaginary curvilinear lateral centerline which defines a locus of points lying halfway between the pressure and suction sidewalls. The orientation of the crossover holes minimizes stress concentration caused by the presence of the crossover holes.

13 Claims, 4 Drawing Sheets

(52) U.S. Cl.
CPC ..... *F05D 2250/14* (2013.01); *Y10T 29/49316* (2015.01); *Y10T 29/49321* (2015.01)

(56) References Cited

U.S. PATENT DOCUMENTS

| | | | | |
|---|---|---|---|---|
| 6,206,638 B1* | 3/2001 | Glynn | ................... | F01D 5/186 415/115 |
| 6,984,102 B2* | 1/2006 | Bunker | ................... | F01D 5/187 415/115 |
| 7,063,506 B2* | 6/2006 | Davison | ................... | F01D 5/18 416/233 |
| 7,168,921 B2 | 1/2007 | Honkomp et al. | | |
| 8,807,943 B1* | 8/2014 | Liang | ................... | F01D 5/187 415/115 |
| 2003/0044277 A1* | 3/2003 | Bourriaud | ............... | F01D 5/186 416/97 R |
| 2016/0341049 A1* | 11/2016 | Neale | ................... | B22C 9/101 |

OTHER PUBLICATIONS

International Search Report Written Opinion issued in connection with corresponding application PCT/US2013/052667 dated Oct. 30, 2013.

* cited by examiner

ROTATING TURBINE COMPONENT WITH PREFERENTIAL HOLE ALIGNMENT

BACKGROUND OF THE INVENTION

This invention relates generally to gas turbine engine components, and more particularly to apparatus and methods for placement of holes in rotating engine components.

A typical gas turbine engine includes multiple high-speed rotating parts, for example one or more compressors interconnected to one or more turbines by shafts. The rotating components experience large centrifugal forces generating stresses therein.

Such rotating components often include mechanical features such as a holes and other discontinuities. As is known in the art, each of these features creates a stress concentration that increases local stresses in the component.

In particular, some "hot section" components such as rotating high pressure turbine ("HPT") blades operate in an extremely high temperature environment. To ensure adequate service life, the blades are hollow and are provided with a flow of coolant, such as air extracted (bled) from the compressor. This coolant flow is circulated through the hollow airfoil's internal coolant path, typically including internal crossover holes, and is then exhausted through a plurality of cooling holes. HPT leading edge crossover holes are formed by a ceramic core as part of a casting process. HPT leading edge crossover holes are typically oriented along the splitline of the core die used to manufacture the core, in order to reduce manufacturing complexity. The result may not be optimum for minimizing stress in the crossover holes.

Accordingly, there is a need for a rotating turbine component incorporating holes, where the additional stress due to the inclusion of the holes is minimized.

BRIEF DESCRIPTION OF THE INVENTION

This need is addressed by the present invention, which provides a turbine engine rotating component having noncircular holes preferentially aligned with respect to stress fields experienced by the component in operation.

According to one aspect of the invention, a turbine airfoil includes: a concave pressure sidewall and a convex suction sidewall joined together at a leading edge and a trailing edge, and extending between a root and a tip; an internal rib extending between the pressure sidewall and the suction sidewall; and a crossover hole formed in the rib, the crossover hole having a noncircular cross-sectional shape with a major axis defining a maximum dimension of the cross-sectional shape; wherein the major axis of the crossover hole lies in plane with the rib and is non-parallel to an imaginary curvilinear lateral centerline which defines a locus of points lying halfway between the pressure and suction sidewalls.

According to another aspect of the invention, a method is provided for making a turbine airfoil of the type including a concave pressure sidewall and a convex suction sidewall joined together at a leading edge and a trailing edge, and extending between a root and a tip; an internal rib extending between the pressure sidewall and the suction sidewall, and a crossover hole formed in the rib, the crossover hole having a noncircular cross-sectional shape with a major axis defining a maximum dimension of the cross-sectional shape. The method includes: determining a primary direction of a local stress field surrounding the crossover hole during operation of the airfoil; and orienting the crossover hole such that its major axis is parallel to primary direction of the local stress field.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
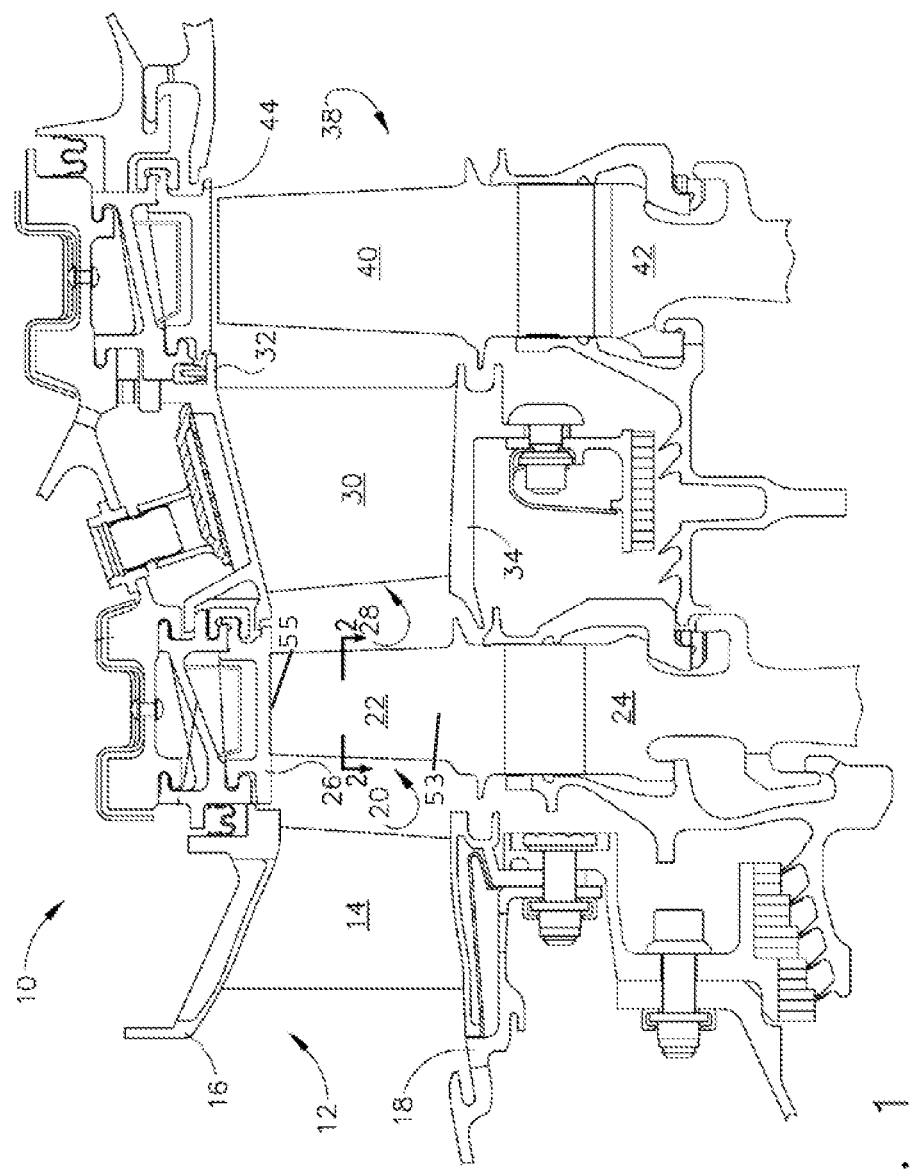
FIG. 1 is a schematic cross-sectional view of a portion of a turbine section of a gas turbine engine, incorporating airfoils constructed in accordance with an aspect of the present invention.

Referring to the drawings wherein identical reference numerals denote the same elements throughout the various views, FIG. 1 depicts a portion of a high pressure turbine 10, which is part of a gas turbine engine of a known type. The turbine shown is a two stage configuration, however high pressure turbines may be a single or multiple stages, each comprising of a nozzle and blade row. The function of the high pressure turbine 10 is to extract energy from high-temperature, pressurized combustion gases from an upstream combustor (not shown) and to convert the energy to mechanical work, in a known manner. The high pressure turbine 10 drives an upstream compressor (not shown) through a shaft so as to supply pressurized air to the combustor.

In the illustrated example, the engine is a turbofan engine and a low pressure turbine would be located downstream of the high pressure turbine 10 and coupled to a fan. However, the principles described herein are equally applicable to turboprop, turbojet, and turboshaft engines, as well as turbine engines used for other vehicles or in stationary applications.

The high pressure turbine 10 includes a first stage nozzle 12 which comprises a plurality of circumferentially spaced airfoil-shaped hollow first stage vanes 14 that are supported between an arcuate, segmented first stage outer band 16 and an arcuate, segmented first stage inner band 18. The first stage vanes 14, first stage outer band 16 and first stage inner band 18 are arranged into a plurality of circumferentially adjoining nozzle segments that collectively form a complete 360° assembly. The first stage outer and inner bands 16 and 18 define the outer and inner radial flowpath boundaries, respectively, for the hot gas stream flowing through the first stage nozzle 12. The first stage vanes 14 are configured so as to optimally direct the combustion gases to a first stage rotor 20.

The first stage rotor 20 includes an array of airfoil-shaped first stage turbine blades 22 extending outwardly from a first stage disk 24 that rotates about the centerline axis of the engine. A segmented, arcuate first stage shroud 26 is arranged so as to closely surround the first stage turbine blades 22 and thereby define the outer radial flowpath boundary for the hot gas stream flowing through the first stage rotor 20.

A second stage nozzle 28 is positioned downstream of the first stage rotor 20, and comprises a plurality of circumferentially spaced airfoil-shaped hollow second stage vanes 30 that are supported between an arcuate, segmented second stage outer band 32 and an arcuate, segmented second stage inner band 34. The second stage vanes 30, second stage outer band 32 and second stage inner band 34 are arranged into a plurality of circumferentially adjoining nozzle segments that collectively form a complete 360° assembly. The second stage outer and inner bands 32 and 34 define the outer and inner radial flowpath boundaries, respectively, for the hot gas stream flowing through the second stage turbine nozzle 34. The second stage vanes 30 are configured so as to optimally direct the combustion gases to a second stage rotor 38.

The second stage rotor 38 includes a radial array of airfoil-shaped second stage turbine blades 40 extending radially outwardly from a second stage disk 42 that rotates about the centerline axis of the engine. A segmented arcuate second stage shroud 44 is arranged so as to closely surround the second stage turbine blades 40 and thereby define the outer radial flowpath boundary for the hot gas stream flowing through the second stage rotor 38.

Figure 2:
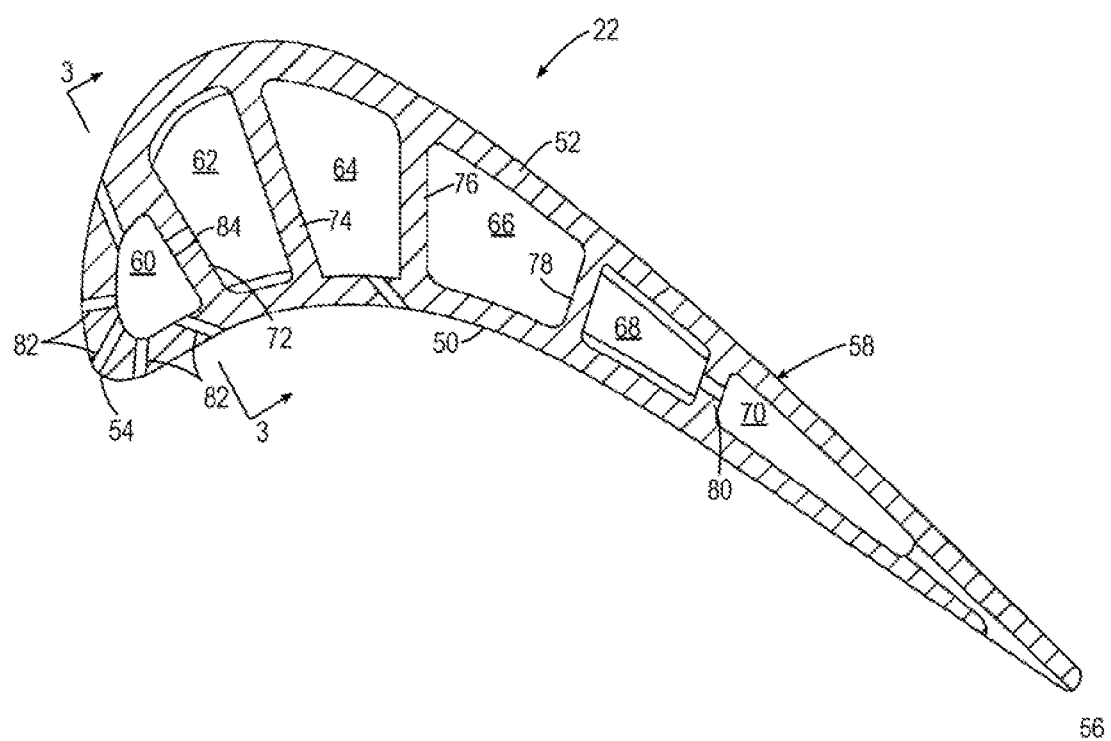
FIG. 2 is a cross-sectional view of a turbine blade taken along lines 2-2 in FIG. 1.

One of the first stage turbine blades 22, simply referred to as a turbine blade, is illustrated in FIG. 2. While a rotating airfoil is used to illustrate the invention, the principles of the present invention are applicable to any turbine airfoil having one or more cooling holes formed therein, for example stationary turbine vanes.

The hollow turbine blade 22 has a concave pressure sidewall 50 and a convex suction sidewall 52 joined together at a leading edge 54 and at a trailing edge 56. Collectively the pressure sidewall 50 and the suction sidewall 52 define the exterior surface 58 of the turbine blade 22. The turbine blade 22 extends from a root 53 to a tip 55 and may take any configuration suitable for absorbing energy from the combustion gas flow. The turbine blade 22 may be formed as a one-piece casting of a suitable superalloy, such as a nickel-based superalloy, which has acceptable strength at the elevated temperatures of operation in the gas turbine engine. Methods of casting such blades are known in the art.

The turbine blade 22 has an internal cooling configuration that includes, from the leading edge 54 to the trailing edge 56, first, second, third, fourth, fifth, and sixth radially extending cavities 60, 62, 64, 66, 68, and 70 respectively. The first and second cavities 60 and 62 are separated by a first rib 72, the third cavity 64 is separated from the second cavity 62 by a second rib 74, the fourth cavity 66 is separated from the third cavity 64 by a third rib 76, the fifth cavity 68 is separated from the fourth cavity 66 by a fourth rib 78, and the sixth cavity 70 is separated from the fifth cavity 68 by a fifth rib 80. The vane's internal cooling configuration, as described thus far, is used merely as an example. The principles of the present invention are applicable to a wide variety of cooling configurations.

In operation, the cavities 60, 62, 64, 66, 68, and 70 receive a coolant (usually a portion of the relatively cool compressed air bled from the compressor) through an inlet passage (not shown). The coolant may enter each cavity 60, 62, 64, 66, 68, and 70 in series or all of them in parallel. The coolant travels through the cavities 60, 62, 64, 66, 68, and 70 to provide convection and/or impingement cooling of the turbine blade 22. The coolant then exits the turbine blade 22, through one or more film cooling holes 82, trailing edge holes, slot, or other openings. The film cooling holes 82 may be arranged in various rows or arrays as needed for a particular application.

The turbine blade 22 incorporates crossover holes in one or more places in the internal structure. In the illustrated example, the first rib 72 is perforated with a single longitudinal row of crossover holes 84. The crossover holes 84 extend in a normal or perpendicular direction through the first web 72. Such holes may be referred to as "leading edge crossover holes."

The crossover holes 84 are configured as impingement holes in accordance with known practices. That is, their diameter and location is selected such that, in operation, each crossover hole 84 will discharge a jet of high-velocity air at an opposed surface, in this case against the inner wall near the leading edge 54.

In operation the rotating turbine blade 22 is subject to both gas loads and to centrifugal loads. The centrifugal loads generate a stress field that acts in a radially outward direction (i.e. the lines of stress pass through the axis of rotation). This direction is noted by the arrows "R" in FIGS. 3 and 4. It is noted that the turbine blade 22 incorporates lateral curvature or "lean". This can be seen by observing an imaginary lateral centerline "S". This lateral splitline S defines a locus of points lying halfway between the pressure and suction sidewalls 50 and 52, and corresponds to the location of a core die splitline. The lateral splitline S is curvilinear and does not lie on a radial line.

As is well known, the presence of holes or other sharp transitions in a mechanical member will induce a stress concentration therein, and the local stresses will be significantly higher than for the same member in the absence of those holes. In the prior art, leading edge crossover holes are typically a location of high internal concentrated stress, and a location of potential cracking during operation.

Figure 3:
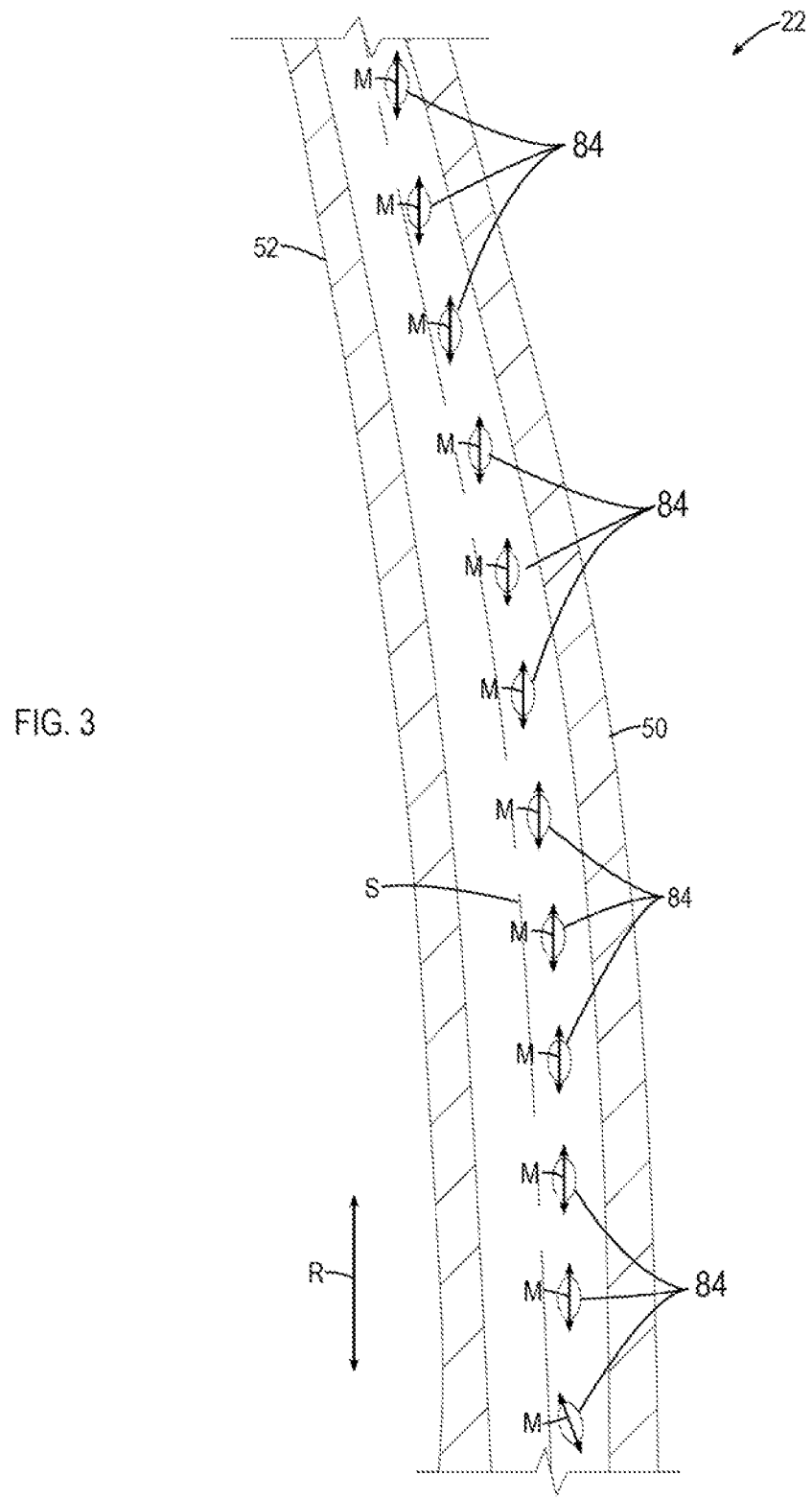
FIG. 3 is a cross-sectional view of a turbine blade taken along lines 3-3 in FIG. 2.
Figure 4:
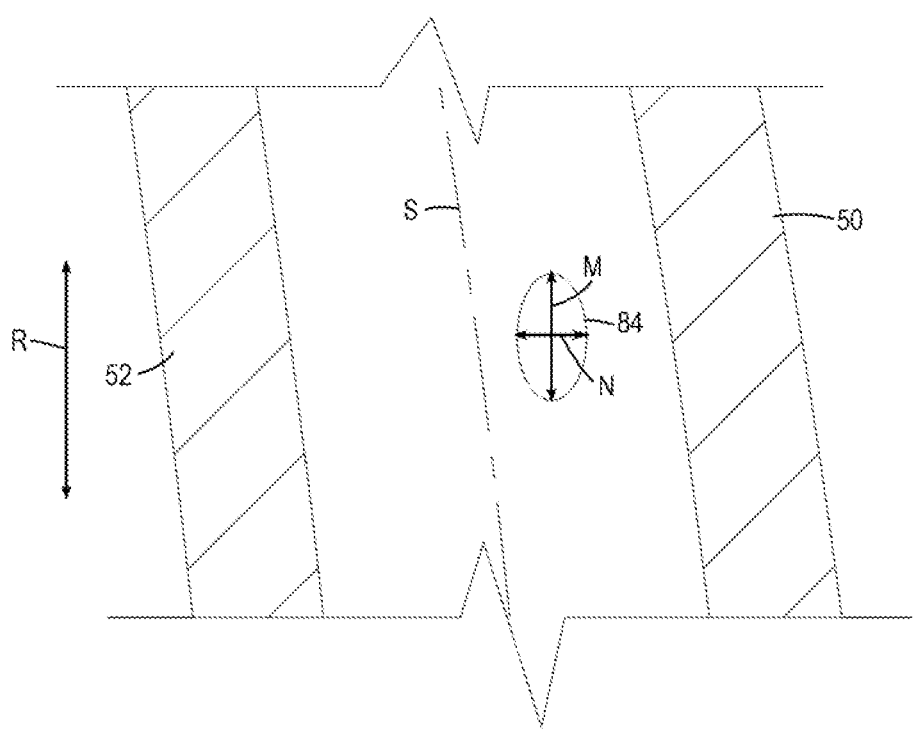
FIG. 4 is an enlarged view of a portion of FIG. 3.

As best seen in FIGS. 3 and 4, the crossover holes 84 have a noncircular cross-sectional shape, in particular, each crossover hole 84 has a generally elongated or ovalized shape. In the illustrated example, their shape is an ellipse having a major axis "M" and a minor axis "N". The major axis M defines the maximum dimension of the cross-sectional shape of the crossover hole 84.

Prior art crossover holes obtain some reduction in the stress concentration factor as (compared to circular holes) by the use of noncircular shapes such as an ellipse. However, to reduce manufacturing complexity and cost, prior art elliptical crossover holes are not aligned with the primary direction of the stress field.

In the turbine blade 22 of the present invention, each crossover hole 84 is oriented optimally with respect to the primary direction of the local stress field surrounding the crossover hole 64, to reduce concentrated stress in the crossover holes 84, i.e. with the major axis M of the crossover hole 84 parallel to the local stress field. In the illustrated example, for most of the crossover holes 84 this means orienting the crossover holes 84 radially, with the major axis M parallel or the radial direction R. For the lowest crossover hole, the stress field is not completely radial, so the optimum hole orientation is approximately 15 degrees off of the radial direction R. The best orientation for each specific crossover hole 84 may be determined by analytical methods, such as known finite element analysis techniques.

The hole orientation described herein results in lower concentrated stress in a potentially life-limiting location, leading to improved durability. This could have a commercial advantage in terms of reduced scrap rates and unscheduled engine removals ("UERs").

The principles of the present invention are not limited to turbine blades or to other turbine airfoils. The same principles may be used to determine the orientation of noncircular holes in any rotating component, such as rotor disks, shafts, interstage seals, impellers, and the like.

The foregoing has described a rotating turbine component for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A turbine airfoil, comprising:
a concave pressure sidewall and a convex suction sidewall joined together at a leading edge and a trailing edge, and extending between a root and a tip;
at least one internal rib extending between the pressure sidewall and the suction sidewall; and a plurality of crossover holes formed in the at least one internal rib, each hole of the plurality of crossover holes having a noncircular cross-sectional shape with a major axis defining a maximum dimension of the cross-sectional shape; wherein the major axis of each hole of the plurality of crossover holes lies in plane with the rib and is non-parallel to a curvilinear lateral centerline which defines a locus of points lying halfway between the pressure and suction sidewalls,
wherein said plurality of crossover holes comprises a radially inward-most crossover hole; said radially inward-most crossover hole oriented at a different angle from the remainder of said plurality of crossover holes, and
wherein said radially inward-most crossover hole contains a major axis which is offset from a radial axis by an angle of at least 10 degrees.

2. The turbine airfoil of claim 1, wherein the major axes of a majority of said plurality of crossover holes are not parallel to the lateral centerline (S).

3. The turbine airfoil of claim 2 wherein a majority of the major axes of the plurality of crossover holes are parallel to each other.

4. The turbine airfoil of claim 1 wherein each hole of the plurality of crossover holes has an elliptical cross-sectional shape with a minor axis perpendicular to the major axis.

5. The turbine airfoil of claim 1 wherein a plurality of spaced-apart ribs extend between the pressure sidewall and the suction sidewall, so as to define a plurality of radially-extending cavities between the leading edge and the trailing edge.

6. The turbine airfoil of claim 5 wherein crossover holes in the plurality of crossover holes are formed in each rib of said plurality of spaced-apart ribs between the root and the tip, wherein the major axes of a majority of the holes of said plurality of crossover holes are not parallel to the lateral centerline.

7. The turbine airfoil of claim 2 wherein said airfoil comprises only one single crossover hole at any radial location along said at least one internal rib.

8. The turbine airfoil of claim 1, the airfoil further comprising;
six cavities; and five ribs wherein each of said five ribs forms a boundary of one or more of said six cavities; wherein each of said concave pressure sidewall and said convex suction sidewall forms a boundary of said six cavities.

9. The turbine airfoil of claim 8 wherein crossover holes in the plurality of crossover holes are formed in each of said five ribs; wherein each hole of said plurality of crossover holes comprises a major axis; and wherein the major axis of each hole of said plurality of crossover holes is non-parallel to said curvilinear lateral centerline.

10. A turbine airfoil, comprising:
a concave pressure sidewall and a convex suction sidewall joined together at a leading edge and a trailing edge, and extending between a root and a tip;
an internal rib extending between the pressure sidewall and the suction sidewall;
and a plurality of crossover holes formed in the internal rib, each hole of the plurality of crossover holes having a noncircular cross-sectional shape with a major axis defining a maximum dimension of the cross-sectional shape;
wherein the major axis of each hole of the plurality of crossover holes is non-parallel to said pressure sidewall and said suction sidewall,
wherein said plurality of crossover holes comprises a radially inward-most crossover hole; said radially inward-most crossover hole oriented at a different angle from the remainder of said plurality of crossover holes, and
wherein said radially inward-most crossover hole contains a major axis which is offset from a radial axis by an angle of about 15 degrees.

11. The turbine airfoil of claim 10 wherein each hole of said plurality of crossover holes is non-parallel to said pressure sidewall and said suction sidewall at a single radial location along said rib.

12. A turbine airfoil, comprising:
a concave pressure sidewall and a convex suction sidewall joined together at a leading edge and a trailing edge, and extending between a root and a tip;
an internal rib extending between the pressure sidewall and the suction sidewall;
and a plurality of crossover holes formed in the rib, each hole of the plurality of crossover holes having a noncircular cross-sectional shape with a major axis defining a maximum dimension of the cross-sectional shape; wherein the major axis of each hole of the plurality of crossover holes lies in plane with the rib and is non-parallel to a curvilinear lateral centerline which defines a locus of points lying halfway between the pressure and suction sidewalls,
six cavities; and
five ribs;
wherein said plurality of crossover holes comprises a radially inward crossover hole; said radially inward crossover hole oriented at a different angle from the remainder of said plurality of crossover holes,
wherein said radially inward crossover hole contains a major axis which is offset from said curvilinear lateral centerline by an angle of at least 10 degrees,
wherein each of said five ribs comprises at least one crossover hole and forms a boundary of one or more of said six cavities;
wherein each of said concave pressure sidewall and said convex suction sidewall forms a boundary of said six cavities:
wherein each of said at least one crossover holes comprises a major axis;
wherein the major axis of each of said at least one crossover holes is non-parallel to said curvilinear lateral centerline; and wherein said airfoil comprises no more than a single crossover hole at any radial location along each of said five ribs.

13. The turbine airfoil of claim 1 wherein each hole of the plurality of crossover holes further comprises a continually contoured outer periphery free from any linear portions.

* * * * *